United States Patent [19]

Chan

[11] Patent Number: 5,498,844
[45] Date of Patent: Mar. 12, 1996

[54] STEERING WHEEL WITH HORN BUTTON OVERLAY

[76] Inventor: Joning C. Chan, 181 Littleton Rd., Bldg. 5, Ste. 337, Chelmsford, Mass. 01824

[21] Appl. No.: 208,634

[22] Filed: Mar. 8, 1994

[51] Int. Cl.$^6$ ............................................. H01H 3/20
[52] U.S. Cl. ........................ 200/331; 200/341; 200/330; 200/61.54
[58] Field of Search ........................ 200/331, 341, 200/330, 329, 61.54, 61.55, 61.56, 61.57, 345, 520, 332, 333, 335, 337, 338, 339; 428/40, 98, 99; 74/484 H, 543, 549, 553; 16/110 R, 118, 116 A

[56] References Cited

U.S. PATENT DOCUMENTS

| | | | |
|---|---|---|---|
| 4,051,340 | 9/1977 | Wolski | 200/329 |
| 4,109,118 | 8/1978 | Kley | 200/5 E |
| 4,163,138 | 7/1979 | Harden | 200/310 |
| 4,228,115 | 10/1980 | Gardner et al. | 264/46.4 |
| 4,375,018 | 2/1983 | Petersen | 200/5 A |
| 4,450,332 | 5/1984 | Stamm et al. | 200/340 |
| 4,490,587 | 12/1984 | Miller et al. | 200/5 A |
| 4,700,033 | 10/1987 | Clark et al. | 200/332 |
| 4,714,806 | 12/1987 | Inui et al. | 200/61.55 |
| 4,789,763 | 12/1988 | Nagata et al. | 200/61.54 |
| 4,808,776 | 2/1989 | Niwa et al. | 200/61.55 |
| 4,872,364 | 10/1989 | Kaga et al. | 74/484 H |
| 4,963,704 | 10/1990 | Buma et al. | 200/61.55 |
| 5,001,311 | 3/1991 | Sakane | 200/61.54 |
| 5,036,169 | 7/1991 | Sakane | 200/61.54 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,193,412 | 3/1993 | Hashiba | 74/552 |
| 5,219,415 | 6/1993 | Weinstein | 200/61.54 |
| 5,222,415 | 6/1993 | Fujita et al. | 74/552 |
| 5,228,362 | 7/1993 | Chen et al. | 74/552 |
| 5,235,146 | 8/1993 | Suzuki | 200/61.54 |
| 5,239,147 | 8/1993 | Allard et al. | 200/61.54 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 |
| 5,276,287 | 1/1994 | Moore | 200/330 |
| 5,317,986 | 6/1994 | Blanes | 200/333 |
| 5,345,050 | 9/1994 | Brancl et al. | 74/553 |
| 5,442,152 | 8/1995 | Huang | 200/345 |

*Primary Examiner*—Henry J. Recla
*Assistant Examiner*—David J. Walczak
*Attorney, Agent, or Firm*—Weingarten, Schurgin, Gagnebin & Hayes

[57] ABSTRACT

A horn button overlay provides an enlarged striking or actuating surface for a horn button on an airbag equipped steering wheel without interfering with airbag deployment. In an illustrative embodiment, a horn button overlay comprises a first substantially planar surface, a second surface opposite the first surface, the second surface having a protruding portion with an adhesive disposed thereon. The horn button overlay can be transparent, brightly colored, or textured.

12 Claims, 1 Drawing Sheet

STEERING WHEEL WITH HORN BUTTON OVERLAY

FIELD OF THE INVENTION

The present invention relates generally to an apparatus for actuating a car horn, and more particularly to a device that enlarges the surface area of an existing steering wheel mounted horn button in a vehicle equipped with a drivers side airbag.

BACKGROUND OF THE INVENTION

In recent years, driver's side airbags have become standard equipment on virtually all new automobiles. Typically, the driver's side airbag is contained within a housing in the central region of a vehicle steering wheel. In the past, the central region of the steering wheel was home to a variety of devices that were used to control various vehicle functions, such as a large horn actuator and various switches for cruise control, radio and the like. However, with the advent of the airbag, these devices were either removed from the steering wheel completely or pushed to its fringe.

Generally, the horn actuator has remained on the steering wheel, albeit considerably reduced in size from the actuators of the past. The reduction in size of the horn actuator ushered in an apt moniker, the "horn button," which accurately describes what the actuator has become. By contrast with the easily located horn actuators of the past, the tiny horn buttons of present era cars require a driver to either grope around the wheel at critical moments, or worse, avert their eyes from the road to perform a visual search for one of the buttons.

The horn, however, is not a mere convenience feature that can be so easily relegated to a position or size of insignificance, requiring time and concentration to assure activation thereof. It is a safety feature that must be quickly and easily located and activated, and is thus deserving of a certain prominence.

One approach to the problem of activating a horn having small horn buttons is disclosed in U.S. Pat. No. 5,219,415 to Weinstein, wherein a horn ring is disclosed. The horn ring includes a flat piece of chrome-plated steel, bent into a U-shape, with L-shaped end portions that are secured to a steering wheel with clasps. A portion of the horn ring is aligned with the horn buttons such that pushing the horn ring causes the horn buttons to be depressed, thereby sounding the horn. It should be noted however, that metal horn rings were abandoned by the automotive industry years ago due to the injury potential were the ring to break during a vehicular collision. Additionally, a horn ring is an obstacle that must be continually evaded during normal manipulations of the steering wheel. Furthermore, a horn ring presents a cluttered appearance that is not in keeping with presently accepted design concepts.

SUMMARY OF THE INVENTION

In a steering wheel having an airbag therein, and one or more tiny horn buttons, an aftermarket device is provided that while being simple to install and aesthetically pleasing, enlarges the actuating surface of the horn button to provide for easier horn activation, without compromising driver safety.

The overlay of the present invention overcomes the above-described limitations by a horn button overlay providing an enlarged surface for horn actuation that is at once easy to install and operate, in addition to being attractive and safe. The overlay provides particular advantages in association with a steering wheel equipped with an airbag.

In one embodiment, the horn button overlay includes a planar element having an adhesive disposed thereon. The planar element can include a protruding portion adapted to cover a horn button.

In another embodiment, the horn button overlay includes a first substantially planar surface larger than the actuation surface of a horn button. A second surface opposite the first surface has a protruding portion with a thickness great enough relative to the distance the horn button must be depressed to allow activation of an associated horn. An adhesive is disposed on a contact surface of the protruding portion to secure the horn button overlay to the actuation surface of the horn button.

BRIEF DESCRIPTION OF THE DRAWINGS

These and further features of the invention may be better understood with reference to the accompanying specification and the drawings in which.

DETAILED DESCRIPTION OF THE INVENTION

Figure 1:
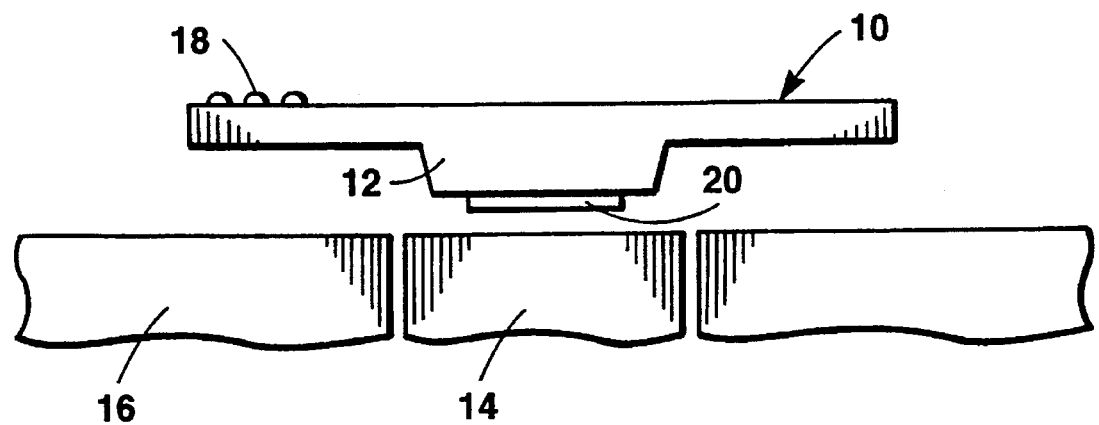
FIG. 1 is a side elevational view of a horn button overlay of the invention disposed adjacent a horn button.

Referring to FIG. 1, a horn button overlay 10 is illustrated. The horn button overlay 10 has a substantially planar first or upper surface and a second or lower surface with a protruding portion 12. In the illustration, the protruding portion 12 is depicted adjacent a horn button 14 that is integral with a steering wheel 16 in order to show an exemplary size relationship between the horn button 14 and the protruding portion 12. It should be noted that although the protruding portion 12 is just slightly smaller than the horn button, the upper surface of the horn button overlay 10 is larger than the horn button 14. In an exemplary embodiment, the surface area of the upper surface of the horn button overlay 10 is two to four times the area of the horn button 14. However, the surface area of the upper surface can be as large as desired, so long as the horn button overlay 10 does not interfere with the operation of an airbag housed within a portion of the steering wheel 16 or interfere with driving operations. It is noted that the larger the overlay, the more noticeable a target it makes to guide the user to the correct horn actuation spot in an urgent situation.

In the exemplary embodiment, the horn button overlay 10 is a transparent plastic such as polyvinylchloride (PVC) or Lexan to minimize the aesthetic impact of the device. Other embodiments provide bright coloration to enhance visibility of the horn button overlay. Furthermore, the horn button overlay 10 can be textured to improve tactile identification. In one embodiment, bumps 18 integral with the upper surface cover either the entire surface or a portion thereon to enhance recognition of the horn button overlay 10.

The protruding portion 12 is provided with an adhesive 20 for attaching the horn button overlay 10 to the horn button 14. In a preferred embodiment, an adhesive 20 covered by a protective backing is affixed to the protruding portion 12. Thus, installation of the horn button overlay 10 simply requires removing the protective backing from the adhesive 20, aligning the protruding portion 12 with the horn button 14, and pressing the horn button overlay 10 against the horn button to bring the adhesive 20 in contact therewith.

Once secured to a horn button 14, the upper surface of the horn button overlay 10 provides a notably enhanced striking or contact surface for depressing the horn button. As the horn button 14 must be depressed a predetermined distance to activate the vehicle horn, the protruding portion 12 has a thickness at least as great as the predetermined distance to prevent any portion of the horn button overlay 10 from impacting the portion of the steering wheel 16 surrounding the horn button 14, which would inhibit horn activation.

Figure 2:
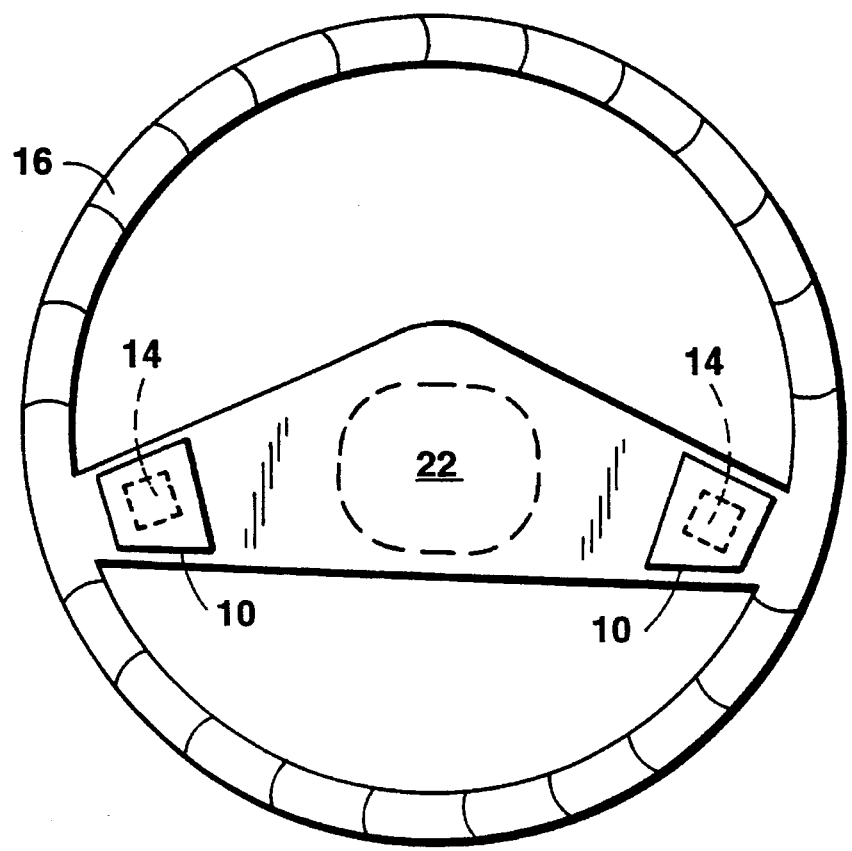
FIG. 2 is a top plan view of the horn button overlay of FIG. 1 installed on an airbag equipped steering wheel.

FIG. 2 is a plan view of a steering wheel 16 equipped with an airbag 22. The steering wheel 16 is shown with a horn button overlay 10 for each of two horn buttons 14. As the illustration clearly shows, the horn button overlays 10 do not at all impinge upon the central area occupied by the airbag 22. In the illustrated embodiment, the planar surface is configured in accordance with the geometry of the steering wheel 16. Accordingly, other shapes adapted to other steering wheel geometries are contemplated. Fanciful shapes are also envisaged.

The horn button overlay 10 disclosed herein is manufactured very easily and thus provides an inexpensive aftermarket retrofit for vehicles having inconvenient and potentially dangerous small horn buttons. While the horn button overlay 10 is simple to install and aesthetically pleasing, it enlarges the actuating surface of the horn button to provide for easier horn activation, without compromising driver safety.

Although the invention has been shown and described with respect to exemplary embodiments thereof, various other changes, omissions and additions in form and detail thereof may be made therein without departing from the spirit and scope of the invention.

What is claimed is:

1. A horn button overlay for a steering wheel having a horn button with a horn button actuator surface, said horn button overlay comprising:

a substrate having a first substantially planar surface larger than said horn button actuation surface;

said substrate having a second surface opposite said first substantially planar surface, said second surface having a protruding portion having a second substantially planar surface smaller than said horn button actuation surface; and an adhesive disposed on said second substantially planar surface, said adhesive securable to said horn button actuation surface.

2. The horn button overlay of claim 1, wherein said first substantially planar surface is textured.

3. The horn button overlay of claim 1, wherein said first substantially planar surface comprises transparent plastic.

4. The horn button overlay of claim 1, wherein said first substantially planar surface includes bright coloration.

5. The horn button overlay of claim 1 with the protruding portion affixed to a steering wheel horn button actuation surface, said protruding portion being raised above said second surface a distance sufficient for the horn button to be depressed to activate an associated horn without said second surface preventing horn button depression by striking a portion of said steering wheel surrounding said horn button.

6. The horn button overlay of claim 5, wherein said steering wheel contains an air bag.

7. The horn button overlay of claim 6, wherein said protruding portion has a contact surface for contacting said horn button, said contact surface being no greater in surface area than said horn button actuation surface.

8. An improved horn button overlay for a steering wheel having old elements including an airbag and a horn button with an actuation surface, said horn button being depressed a predetermined distance to activate an associated horn, wherein the improved horn button overlay comprises:

a first substantially planar surface larger than said actuation surface;

a second surface opposite said first surface, said second surface having a protruding portion raised above said second surface a distance sufficient for the horn button to be depressed to activate an associated horn without said second surface preventing horn button depression by striking a portion of said steering wheel surrounding said horn button; and an adhesive disposed on a contact surface of said protruding portion to secure said horn button overlay to said horn button actuation surface.

9. The horn button overlay of claim 8, said protruding portion further having a contact surface no greater in surface area than said horn button actuation surface.

10. The horn button overlay of claim 8, wherein said first substantially planar surface is textured.

11. The horn button overlay of claim 8, wherein said first substantially planar surface comprises transparent plastic.

12. The horn button overlay of claim 8, wherein said first substantially planar surface includes bright coloration.

* * * * *